Dec. 6, 1955    P. M. AHLSTRAND ET AL    2,725,722
AUTOMATIC APPARATUS FOR DISPENSING GAS
Filed March 9, 1954    2 Sheets-Sheet 1
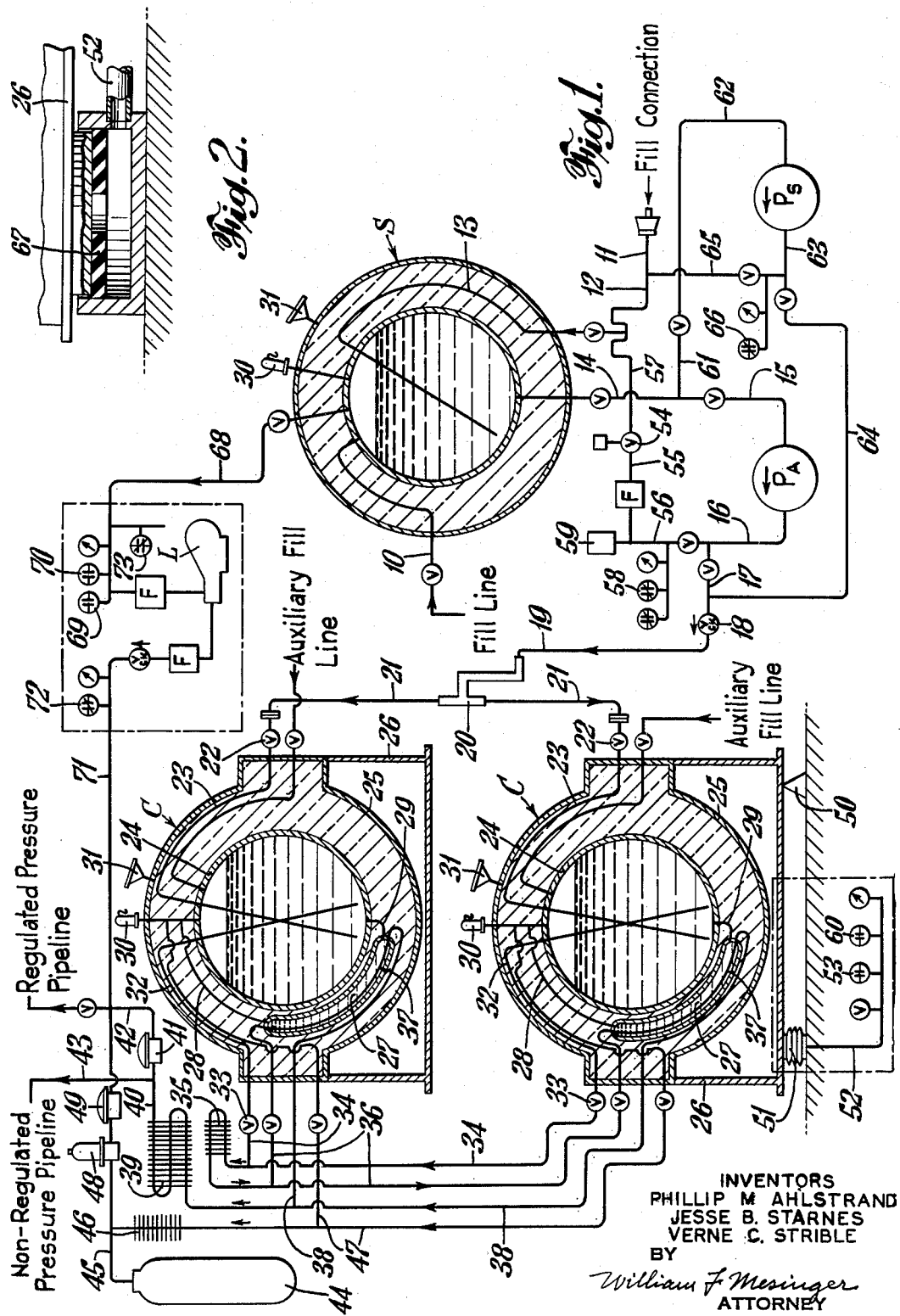
INVENTORS
PHILLIP M. AHLSTRAND
JESSE B. STARNES
VERNE C. STRIBLE
BY
William F. Mesinger
ATTORNEY

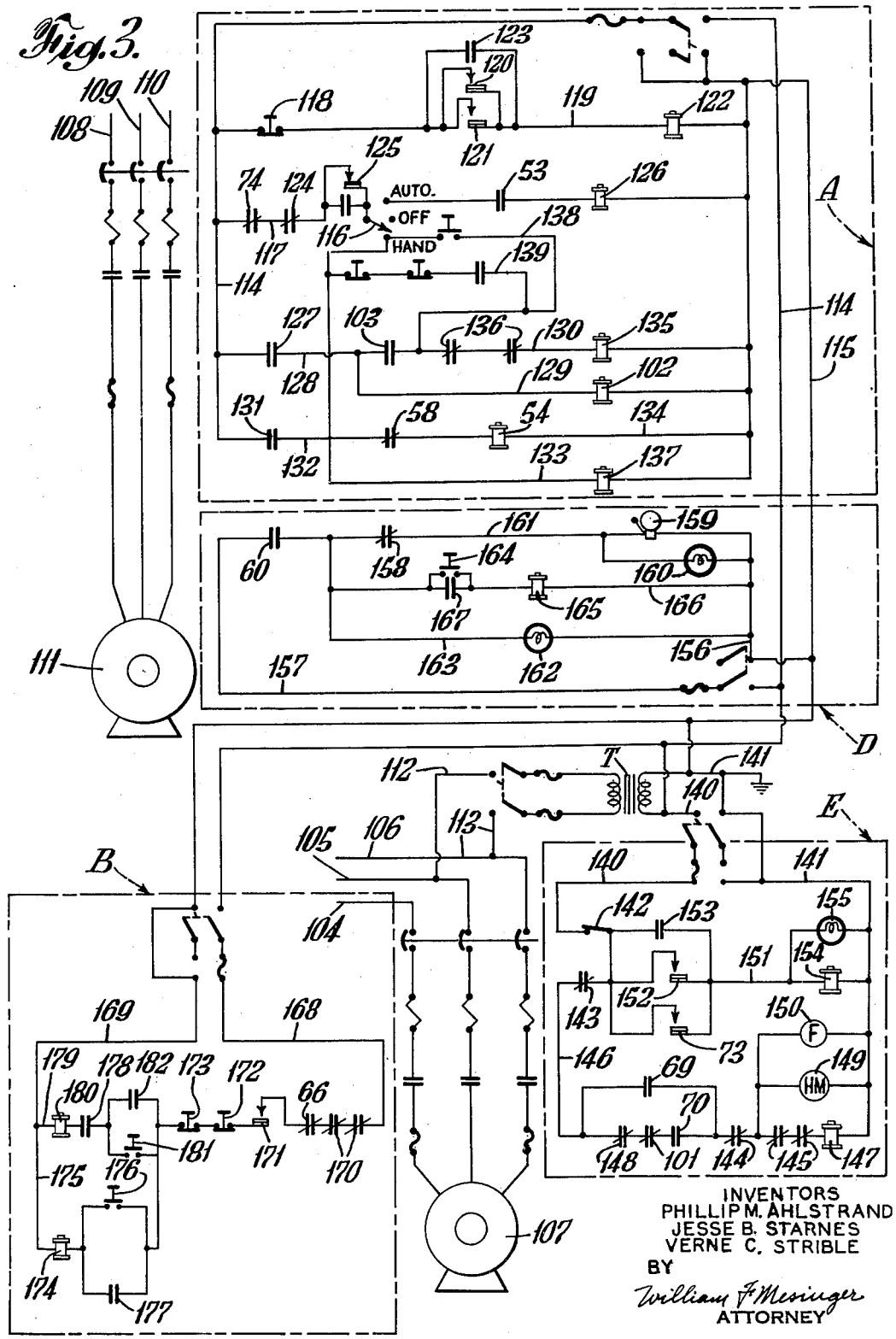

United States Patent Office 2,725,722
Patented Dec. 6, 1955

2,725,722

AUTOMATIC APPARATUS FOR DISPENSING GAS

Phillip M. Ahlstrand, Kenmore, Jesse B. Starnes, Snyder, and Verne C. Strible, Kenmore, N. Y., assignors to Union Carbide and Carbon Corporation, a corporation of New York Application March 9, 1954, Serial No. 415,118

7 Claims. (Cl. 62—1)

The present invention relates to apparatus for automatically dispensing gas converted from low-boiling point liquefied gas.

Heretofore, various apparatus have been provided for effecting the withdrawal, vaporization, and superheating of liquefied gas from insulated storage means and supplying the gaseous product at both regulated and non-regulated pressures in response to the demands of consuming apparatus, referred to as the "consumer's pipeline." One of such systems employs a large, low pressure, insulated, storage vessel for liquefied gas for feeding single or multiple, parallel-connected, insulated pressure containers of smaller size (referred to as "cold converters") which in turn supply liquefied gas at the desired rate and pressure to vaporizing and superheating means which deliver the gaseous product to the customer's pipeline. In such a system the rate of withdrawal of liquefied gas from the cold converters is determined by the demand of the consumer's pipeline: when the demand is low the withdrawal rate is low; when the demand is high the withdrawal rate is high. In order to determine the level of volatile liquid in and to refill individually the converters of a bank of cold converters, the prior art employed manual means, such as liquid level indicators and manually activated pumps, for transferring liquefied gas from the storage vessel to the cold converters.

In addition, the prior art has controlled the pressure in the low pressure storage vessel by venting to atmosphere the evaporation caused by pump inefficiency and by heat leak into the piping, the pump system, and the tank. Thus, the prior art permitted the loss of valuable product during control of the pressure in the vessel. Further, the pressure in the gas phase of the low pressure vessel was not automatically increased in direct relation to the withdrawal of liquid from the storage tank in order to aid the operation of the liquefied gas pump. Prior art apparatus permitted errors and omissions of personnel to create either poor suction conditions at the pump with consequent lowering of pumping rate and increasing of product loss or high pressure conditions in the storage tank with consequent loss of product through safety devices, and, consequently, has not provided a satisfactory system for automatically supplying liquefied gas to the cold converter bank in response to the demand of the consumer's pipe line.

It is, therefore, the main object of the present invention to provide such a system which is fully automatic and will, without any loss of the product resulting from the operation of the liquid pump and piping system, continuously provide a sufficient quantity of liquefied gas in a cold converter or a cold converter bank to meet the demand of the consumer's pipe line.

Another object is to provide a system wherein a plurality of converters are simultaneously charged while they are operative to supply the pipe line so that all the converters of the bank are operative to supply the pipeline during sudden demands for gas at the high demand rate.

A further object is to provide a system wherein a plurality of cold converters can be simultaneously charged while supplying gas to a consumer line, which system is simplified by employing liquid level sensing means on only one of the converters.

A still further object is to provide such a system wherein the vaporization losses during storage are reduced to a minimum.

A further object is to provide a system having means for providing a cooling or priming period for the liquefied gas pump so that the wear of the pump will be minimized and successful delivery will be assured.

A further object is to provide a system having means to insure that no cavitation occurs in the pump suction so that the priming period is minimized and the delivery rate is increased.

A further object is to provide means for minimizing vibration of the piping and shock loading of the pump during the first period of flow towards the cold converters so that wear is minimized and hydraulic pressure waves do not cause the pump to lose prime.

A further object is to provide means for notification of impending failure of the supply of gas to the consumer's pipe line so that remedial action may be taken in time to maintain the supply of gas.

Another object is to provide a system wherein manual labor by the consumer, heretofore depended upon for normal operation of the dispensing equipment, is eliminated.

A further object is to provide a means for accurately determining the amount of liquefied gas in a high pressure container.

A further object is to provide a means of stopping the vapor compressor if the liquefied gas from the storage tank should enter the suction pipe of the vapor compressor.

In the drawings:

Fig. 1 is a schematic view of an automatic gas dispensing system embodying the invention and using a liquid level sensing control means including a hydraulic bellows-type control element;

Fig. 2 is a partial vertical sectional view of a piston-type hydraulic control element which may alternatively be employed in the system of Fig. 1; and Fig. 3 is an electrical circuit diagram of the apparatus employed in the system of Fig. 1.

In accordance with the present invention, there is provided; storage tank means S for storing a low boiling point liquefied gas in a condition substantially insulated against heat inflow from external sources, a vapor compressor L for control of storage tank pressure by removing vaporization from the storage tank and supplying this gas to the consumer's pipe line in response to the pressure in the storage tank and with provision for maintaining such tank pressure at a higher level during the operating cycle of either cold converter filling pump $P_A$ or $P_B$, cold converter or parallel-connected bank of cold converters C for delivering liquefied gas in response to the demand of the consumer's pipe line, liquefied gas conduit means including the pumps $P_A$ or $P_B$ for transferring liquefied gas from the storage tank to the cold converter bank, vaporizing and superheating means associated with the cold converters and a pressure regulating manifold for withdrawing liquefied gas from the cold converters and supplying it in the gaseous phase to the consumer's pipe line, and automatic pump control means comprising a liquid content responsive device associated with the converter or one converter of a bank and preferably including a closed hydraulic pressure system responsive to the change in weight of liquefied gas in the cold converter and operative to control the pumping of liquefied gas from the storage tank S to the cold converter or cold converter bank to maintain a level of liquefied gas therein between pre-determined limits.

Referring to the drawing, and particularly to Fig. 1, a liquefied gas filling conduit 10 is provided for a pumping and measuring means which transfers a low boiling point liquefied gas from a transport means to storage tank means S which comprises an inner shell and an outer shell separated by insulating material, preferably of the powder-in-vacuum type disclosed in U. S. Patent No. 2,396,459. An alternative connection 11 is provided for pumping liquid from the tank S to a transport means by use of pump $P_S$ or for filling liquid into tank S, or for pumping liquid into converter C directly from a combined transport, pump, and measuring means. A conduit 13 is provided to complete a pump priming circuit, or to fill the storage tank S. Automatic pump $P_A$ withdraws liquefied gas from tank S through conduit 14 and 15 and transfers it through conduit 16, conduit 17, check valve 18, conduit 19, a manifold 20, and conduits 21 to each of the parallel-connected cold converters C through their respective conduits 23. A flow equalizing means 22, preferably an adjustable hand valve, is provided in each line 21 for effecting an equalization of the flow of liquefied gas to each of the cold converters.

Each cold converter C comprises an inner pressure vessel 24 surrounded by heat insulating material, preferably of the powder-in-vacuum type, and an outer shell 25. Base structures 26 support each cold converter. A liquefied gas space 27 is provided in the insulation of the cold converter and is in communication with the inner vessel 24 through conduits 28 and 29 connecting to gas and liquid phases respectively. Relief valves 30 are provided to vent gas from the storage tank S and each cold converter C in the event of excessive pressures. Safety heads 31 are provided to vent gas from the insulating material of storage tank S and each cold converter C in the event of accidental leakage. Liquefied gas is drawn from the inner vessel 24 of each converter C through conduits 32, and passes through conduits 34 to a heating means 35 where it is vaporized and superheated. A flow equalizing means, preferably a hand valve 33, is provided in each line 34 and is pre-set to effect an equalization of the flow of liquefied gas from each of the cold converters C. The vaporized and superheated product is then passed through conduits 36 to conduits 37 which are enclosed in the liquefied gas of spaces 27 to effect a vaporization of a portion of liquefied gas in that space and thereby increase the pressure in the inner vessel 24. After passing through conduits 37, enclosed in spaces 27, the vaporized gas is then passed through conduit 38, to a reheating means 39, where it is reheated to a desired temperature.

A conduit 40 conducts the gas to the inlet of a reducing valve 41 which maintains the discharge pressure at a desired value for the pipe line. Conduit 42 connects the outlet of valve 41 to the consumer's regulated pipe line. A conduit 43 supplies gas at a non-regulated pressure from the inlet end of reducing valve 41 to the non-regulated pipe line. A gas storage receiver 44 is in communication with the upper portion of each cold converter vessel through conduit 45, a heating means 46, and a conduit 47 and serves to prevent excessive rates of variation of pressure caused by filling of the converters and by fluctuations in the consumer's demand. When pressure in the gas storage receiver 44 and conduit 45 is above a set value gas flows from conduit 45 to conduit 42 through a back pressure valve 48 and a reducing valve 49 which are connected between conduit 45 and conduit 42. Preferential flow of gas through reducing valve 49 with respect to gas through reducing valve 41 is effected by a setting of the reducing valve 49 to open at a pressure valve higher than the pressure setting of reducing valve 41.

The automatic control of liquefied gas level in the cold converter bank is provided by supporting a cold converter base structure 26 at one side on a pivot or pivots 50 and at the other side on a bellows 51 which is a part of a closed hydraulic system 52. A pressure is developed in this closed hydraulic system by a portion of the weight of the cold converter and the liquefied gas contained therein.

A pressure actuated switch 53 operable by the hydraulic pressure in the closed system operates to start the automatic pumping cycle. When the pressure in the hydraulic system drops to below a predetermined value, due to the drop in the liquefied gas level in the bank of cold converters, the pressure switch 53 in the closed hydraulic system is connected in a control circuit hereinafter described to actuate three devices as follows. First, valve 54 opens in a conduit 55 thus opening the priming circuit path of flow of liquefied gas from the storage tank S through conduits 14 and 15, connecting bottom of tank S to inlet of pump $P_A$, then through pump discharge conduit 16, conduit 56 connected thereto, and to conduit 55, valve 54, and a conduit 57, connecting to conduit 13. Next, a relay switch 101 of Figure 3 opens in the vapor compressor controls causing the storage tank S pressure to be controlled at a higher range. Then a time delay relay 102 of Figure 3 is actuated to provide the cooling interval before starting the pump $P_A$. These actions constitute the start of a "demand prime cycle."

After a pre-determined time interval for bringing pump $P_A$ to a proper temperature, the pump $P_A$ is started by the closing of the time delay relay switch 103 of Figure 3. The pressure of pump discharge acting on a pressure switch 58 connected to conduit 56 increases as the pump primes and liquid flow increases through the conduits 16, 56, 55, 57, and 13 and when the setting of pressure switch 58 is reached, the solenoid valve 54 is closed. Liquefied gas passes into a surge chamber 59 also connected to conduit 56 and pressure rapidly increases to overcome the cold converter pressure acting on check valve 18. Liquefied gas is then delivered to the cold converters C from storage tank S through the liquefied gas delivery line comprising conduits 16, 17, 19, 21 and 23. When the liquefied gas level in the cold converter reaches a predetermined value, and the hydraulic pressure acting on pressure switch 53 increases to a preselected value, the switch actuates the control system to stop the automatic pump $P_A$ for stopping the transfer of liquefied gas from the storage vessel, to keep the priming circuit path closed, and to permit vapor compressor control of the storage tank pressure at the normal lower pressure range.

If the automatic pumping system should fail causing an extreme drop in the liquefied gas level in the cold converter, a pressure switch 60 connected in the hydraulic circuit 52 is actuated which sets off an alarm system giving the consumer sufficient warning to start stand-by pump $P_S$ before the cold converters are emptied. This stand-by pump $P_S$ is connected in parallel with automatic pump $P_A$ through conduits 61, 62 connecting between conduit 14 and the inlet of pump $P_S$, conduits 63, 64 connecting discharge of pump $P_S$ to conduit 17, and 65 connecting through conduit 12 to conduit 13. The stand-by pump line 63 is provided with a pressure switch 66 which automatically stops the stand-by pump when an excessive pressure is developed in conduit 63.

The use of a specific bellows and pivoted support arrangement, such as shown in the embodiment of Fig. 1 of the drawings, is not the only type of arrangement required for the successful operation of the apparatus of the present invention, and the invention is not limited to such an arrangement. Any suitable equivalent arrangement, by which at least a portion of the weight of a cold converter can be applied to a closed hydraulic system may be employed. For example, the embodiment shown in Fig. 2 employs an elastic diaphragm 67 bonded to a piston for transferring at least part of the weight of the cold converter to hydraulic pressure in the closed hydraulic system.

Incorporated in the embodiment of Fig. 1 is a vapor compressor system for delivering the evaporation due to insulation heat leak within the storage tank to the consumer's regulated pressure pipe line at a proper regulated pressure. Line 68 from the upper portion of storage tank S supplies such gas to the inlet of a vapor compressor L. Pressure switches 69 and 70 connected to line 68 control the operation of the vapor compressor L. Filters F are preferably provided in the line on both sides of the vapor compressor. When the vapor is compressed to line pressure it is passed through compressor discharge conduit 71 to the consumer's regulated pipe line 42. A compressor discharge overpressure pressure switch 72 is connected to line 71. A cold liquefied gas detecting temperature-operated switch 73 is preferably placed in conduit 68 to stop the vapor compressor L in the event the storage tank S is overfilled.

The electrical system control circuit, as shown in Fig. 3 of the drawings, comprises four interconnected circuits; an automatic pump control circuit A, a stand-by pump control circuit B, an alarm control circuit D, and a vapor compressor control circuit E.

Power lines 104, 105 and 106 lead from a three phase power source (not shown) and are connected to the drive motor 107 of vapor compressor L. Power lines 108, 109 and 110 connect the automatic pump motor 111 in parallel with the vapor compressor drive motor. The voltage of one phase of the three phase power line is tapped off through leads 112 and 113 to the primary side of step-down voltage transformer T. To the secondary of transformer T the power leads 114–115 and 140–141 for the four control circuits (A, B, D and E) are connected in parallel.

Power is supplied to the automatic pump control circuit through lines 114 and 115. Three way control switch 116, having an "off," "hand" and "automatic" setting, is located in line 117 which is connected across power lines 114 and 115. When reset switch 118 in parallel line 119 connected across lines 114 and 115 is closed and automatic pump gas pass low temperature disconnect temperature-operated switch 120 therein is open and automatic pump shaft seal low temperature disconnect temperature-operated switch 121 therein is open, a relay 122 in line 119 is de-energized which keeps contactor 123 in line 119 normally open and contactor 124, in line 117, normally closed. With three way control switch 116 set in the "automatic" position and the automatic pump overpressure disconnect pressure switch 74 in line 117 closed and the automatic pump gas pass low temperature control temperature-operated switch 125 in line 117 closed and liquefied gas level pressure switch 53 in line 117 closed, the circuit through line 117 is energized causing relay 126 in line 117 to close two contactors; contactor 127 in a line 128 which in series with the parallel connected lines 129 and 130 is connected across power lines 114 and 115, and contactor 131 in a line 132 which, in series with the parallel connected lines 133 and 134, is connected across power lines 114 and 115. The closing of contactor 127 energizes time delay relay 102 in line 129 and, at the conclusion of a time period, contactor 103 closes energizing motor controller operating coil 135 in line 130 which is in series with normally closed motor controller overload contactors 136. The closing of contactor 131 energizes the operating coil of solenoid valve 54 which is in series with the closed contacts of the automatic pump priming pressure switch 58 in line 134. Also the closing of contactor 131 energizes the tank upper pressure range relay 137 which opens contactor 101 in the vapor compressor control circuit thereby placing operation of the vapor compressor under control of upper pressure range control switch 69. Line 119 connected across lines 114 and 115 is provided to contain the safety stop circuit that will de-energize the complete control circuit of the automatic pump P$_A$ comprising all other parallel lines connected across lines 114 and 115. The safety stop switch circuit operates in event of the closing of temperature-operated switch 120 or 121 as follows: reset switch 118 is closed, temperature-operated switch 120 and/or 121 is closed, relay 122 is energized causing contactor 123 to close and contactor 124 in line 117 to open. Relay 122 will continue energized after temperature-operated switch 120 and/or 121 open by current flowing through parallel connected contactor 123 until reset switch 118 is opened. Line 117 contains in series with switch 116 two control switches, pressure switch 74 and temperature-operated switch 125, which disconnect the complete control circuit of the automatic pump P$_A$ during the period undesirable conditions exist. With the three way switch 116 in the "hand" position the relay 137 is energized and opens contactor 101 thereby placing operation of the vapor compressor under control of pressure switch 69. Also the operating coil of solenoid valve 54 is energized. Also the stopping and starting of the automatic pump motor is now under manual control through the circuit comprising lines 138, 139, and 130.

Power is supplied to vapor compressor control circuit E through lines 140 and 141. With reset switch 142 in line 140 and contactor 143, over-pressure disconnect pressure switch 144, and motor controller overload contactors 145 in line 146 closed, the motor controller operating coil 147 is energized when either upper pressure range control switch 69 is closed or lower pressure range control switch 70 together with contactors 101 and 148 are closed. Hour meter 149 and coolant fan 150 are energized simultaneously with operating coil 147. Line 151 connected across lines 140 and 141 contains the safety stop circuit comprising the parallel connected temperature-operated switch 73, temperature-operated switch 152 and contactors 153 connected in series with the parallel connected relay 154 and lamp 155.

Power is supplied to the alarm control circuit D through lines 156 and 157. With contactor 158 closed, parallel connected alarm bell 159 and lamp 160 in line 161 are energized when pressure switch 60 closes. Also when pressure switch 60 closes, the lamp 162 in line 163 is energized. When alarm silencer switch 164 is closed, relay 165 in line 166 is energized opening contactor 158 in line 161, thereby de-energizing bell 159 and lamp 160. In addition relay 165 closes the contactor 167 which is parallel connected with switch 164 so that the relay 165 is held energized after momentary closing of switch 164. Relay 165 and lamp 162 will remain energized until pressure switch 60 opens.

Power is supplied to the stand-by pump control circuit B through line 168 and 169. Two hand switches must be operated to start the stand-by pump. With motor controller overload contacts 170, overpressure disconnect pressure switch 66, gas pass low temperature disconnect temperature-operated switch 171, stop switch 172 and stop switch 173, all series connected in line 168 and normally closed, relay 174 in line 175 is energized by the closing of start switch 176, thereby closing contactors 177 and 178 in lines 175 and 179 respectively. Also when relay 174 is energized contactor 148 in the vapor compressor control circuit opens thereby placing operation of the vapor compressor under control of upper pressure range control switch 69. Relay 174 is held energized by contactor 177 in parallel with switch 176. Now the closing of start switch 181 in line 179 energizes the motor-controller operating coil 180 which closes contactors in the stand-by pump motor three phase power line (not shown), and contactor 182 in parallel with switch 181.

What is claimed is:

1. Apparatus for automatically supplying gas converted from low boiling point liquefied gas comprising insulated storage vessel means for storing liquefied gas; at least one insulated pressure container for liquefied gas; liquid conduit means including a pump for transferring liquefied gas from said storage vessel means to each of said insulated containers; liquefied gas withdrawal conduit means leading from said insulated containers to a consuming device at a desired pressure and having heating means associated therewith for vaporizing and superheating said liquefied gas; at least one of said insulated pressure containers being at least partially supported by the pressure developed in a closed hydraulic system by the weight of said container transmitted to said system; and automatic pump control means, communicating between said hydraulic system and said pump, responsive to the hydraulic pressure developed in said system and adapted to supply liquefied gas to said insulated containers at a rate necessary to maintain the liquefied gas level in said containers between predetermined high and low values.

2. Apparatus for automatically supplying gas converted from low boiling point liquefied gas comprising insulated storage vessel means for storing liquefied gas; a plurality of parallel-connected insulated pressure containers for liquefied gas; liquid conduit means including a pump for transferring liquefied gas from said storage vessel means to said insulated containers; liquefied gas withdrawal conduit means leading from each of said insulated containers to a consuming device at a desired pressure and having heating means associated therewith for vaporizing and superheating said liquefied gas; at least one of said insulated pressure containers being at least partially supported by the pressure developed in a closed hydraulic system by the weight of said container transmitted to said system; and automatic pump control means, communicating between said hydraulic system and said pump, responsive to the hydraulic pressure developed in said system and adapted to supply liquefied gas to said insulated containers at a rate necessary to maintain the liquefied gas level in said insulated containers between predetermined high and low values.

3. Apparatus for automatically supplying gas converted from low boiling point liquefied gas comprising insulated storage vessel means for storing liquefied gas; a plurality of parallel-connected insulated pressure containers for liquefied gas; liquid conduit means including a pump for transferring liquefied gas from said storage vessel means to said insulated containers; liquefied gas withdrawal conduit means leading from each of said insulated containers to a consuming device at a desired pressure and having heating means associated therewith for vaporizing and superheating said liquefied gas; conduit means, including a compressor, comunicating between said insulated vessel means for storing liquefied gas and said consuming device and adapted to compress the liquefied gas vaporized in said storage vessel means and transfer it to said consuming device at said desired pressure; at least one of said insulated pressure containers being at least partially supported by the pressure developed in a closed hydraulic system by the weight of said container transmitted to said system; and automatic pump control means, communicating between said hydraulic system and said pump, responsive to the hydraulic pressure developed in said system and adapted to supply liquefied gas to said containers at a rate necessary to maintain the liquefied gas level in said insulated containers between predetermined high and low values.

4. Apparatus for automatically supplying gas converted from low boiling point liquefied gas comprising insulated storage vessel means for storing liquefied gas;

a plurality of parallel-connected insulated pressure containers for liquefied gas; liquid conduit means including a pump for transferring liquefied gas from said storage vessel means to said insulated containers; liquefied gas withdrawal conduit means leading from each of said insulated containers to a consuming device at a desired pressure and having heating means associated therewith for vaporizing and superheating said liquefied gas; at least one of said insulated pressure containers being at least partially supported by the pressure developed in a closed hydraulic system by the weight of said container transmitted to said system; and automatic pump control means, communicating between said hydraulic system and said pump, responsive to the hydraulic pressure developed in said system and adapted to supply liquefied gas to said containers at a rate necessary to maintain the liquefied gas level in said insulated containers between predetermined high and low values; and pressure-responsive alarm means associated with said closed hydraulic pressure system for warning when the liquefied gas level in said insulated containers falls below a predetermined value.

5. Apparatus for automatically supplying gas converted from low boiling point liquefied gas comprising insulated storage vessel means for storing liquefied gas; a plurality of parallel-connected insulated pressure containers for liquefied gas; liquid conduit means including a pump for transferring liquefied gas from said storage vessel means to said insulated containers; liquefied gas withdrawal conduit means leading from each of said insulated containers to a consuming device at a desired pressure and having heating means associated therewith for vaporizing and superheating said liquefied gas; at least one of said insulated pressure containers being pivotally mounted at one side thereof and at least partially supported at the other side thereof by the pressure developed in a closed hydraulic system by the weight of said container transmitted to said system; and automatic pump control means, communicating between said hydraulic system and said pump, responsive to the hydraulic pressure developed in said system and adapted to supply liquefied gas to said containers at a rate necessary to maintain the liquefied gas level in said insulated containers between predetermined high and low values.

6. Apparatus for automatically supplying gas converted from low boiling point liquefied gas in accordance with claim 5, wherein the pressure necessary to support said pivotally-mounted insulated pressure container is developed in said closed hydraulic system by the weight of said container on bellows support means in said closed hydraulic system.

7. Apparatus for automatically supplying gas converted from low boiling point liquefied gas in accordance with claim 5, wherein the pressure necessary to support said pivotally-mounted insulated pressure container is devolped in said closed hydraulic system by the weight of said container on piston support means in said system.

References Cited in the file of this patent

UNITED STATES PATENTS

| | | |
|---|---|---|
| 2,435,332 | Van Fleet et al. | Feb. 3, 1948 |
| 2,502,184 | Thayer | Mar. 28, 1950 |
| 2,544,734 | St. Clair | Mar. 13, 1951 |
| 2,550,886 | Thompson | May 1, 1951 |